(12) United States Patent
Greenwood et al.

(10) Patent No.: US 6,504,831 B1
(45) Date of Patent: Jan. 7, 2003

(54) OPTICAL SIMULCAST NETWORK WITH CENTRALIZED CALL PROCESSING

(75) Inventors: Ken C. Greenwood, Bedford, NH (US); Erik T. DeVinney, Goffstown, NH (US); Richard P. Slabinski, Park City, UT (US)

(73) Assignee: Lockhead Martin Corporation, Nashua, NH (US)

( * ) Notice: Subject to any disclaimer, the term of this patent is extended or adjusted under 35 U.S.C. 154(b) by 0 days.

(21) Appl. No.: 09/256,244

(22) Filed: Feb. 23, 1999

(51) Int. Cl.[7] .......................... H04B 7/216; H04Q 7/28; G08B 26/00; H04M 15/00
(52) U.S. Cl. .................. 370/342; 370/327; 340/505; 379/111
(58) Field of Search ................ 370/342, 327; 379/111; 340/505

(56) References Cited

U.S. PATENT DOCUMENTS

| | | | |
|---|---|---|---|
| 4,392,245 A | 7/1983 | Mitama | 455/115 |
| 4,449,247 A | * 5/1984 | Waschka, Jr. | 340/505 |
| 5,067,173 A | 11/1991 | Gordon et al. | 359/152 |
| 5,129,098 A | 7/1992 | McGirr et al. | 455/69 |
| 5,173,933 A | * 12/1992 | Jabs et al. | 379/111 |
| 5,175,727 A | * 12/1992 | Maher et al. | 370/327 |
| 5,193,223 A | 3/1993 | Walczak et al. | 455/115 |
| 5,303,287 A | 4/1994 | Laborde | 379/59 |
| 5,321,736 A | 6/1994 | Beasley | 379/58 |
| 5,381,459 A | 1/1995 | Lappington | 379/56 |
| 5,396,484 A | 3/1995 | Itoh | 370/11 |
| 5,452,473 A | 9/1995 | Weiland et al. | 455/88 |
| 5,475,870 A | 12/1995 | Weaver, Jr. et al. | 455/67.1 |
| 5,513,176 A | 4/1996 | Dean et al. | 370/18 |
| 5,515,014 A | 5/1996 | Troutman | 332/178 |
| 5,590,173 A | 12/1996 | Beasley | 379/58 |
| 5,768,279 A | 6/1998 | Barn et al. | 370/486 |
| 5,781,541 A | 7/1998 | Schneider | 370/335 |
| 5,781,859 A | 7/1998 | Beasley | 455/423 |
| 5,802,173 A | 9/1998 | Hamilton-Piercy et al. | 379/56.2 |
| 5,805,983 A | 9/1998 | Naidu et al. | 455/67.6 |
| 5,809,395 A | 9/1998 | Hamilton-Piercy et al. | 455/4.1 |
| 5,822,324 A | 10/1998 | Kostresti et al. | 370/487 |

FOREIGN PATENT DOCUMENTS

| | | |
|---|---|---|
| EP | WO 97/32442 | 9/1997 |
| GB | 2253770 A | 9/1992 |
| GB | 2289198 A | 11/1995 |

* cited by examiner

*Primary Examiner*—William Cumming
(74) *Attorney, Agent, or Firm*—Hamilton, Brook, Smith & Reynolds, P.C.

(57) ABSTRACT

A system for distributing radio frequency signals in a wireless communication network that provides an economical method of establishing and then later enhancing network coverage and capacity. The system centrally deploys Base Transceiving System (BTS) equipment and distributes their signals through a fiber network to individual cable microcell integrators (CMI) associated with the individual cell sectors of the system. The CMIs contain filtering equipment that permit them to be assigned in simulcast groups, depending upon the desired network capacity. For example, in an initial build out situation, a large number of CMIs operate at a common carrier frequency, modulation code, and/or code phase. As network demands increases, additional capacity is provided by reprogramming filters and/or signal processors in the CMIs. The approach results in high utilization of centrally located BTS equipment, avoids the need to re-engineer or redeploy additional RF equipment after an initial design phase, and has an added benefit of improved backhaul trunking efficiency while avoiding the need to deploy both fiber and cable physical media at the remove sites.

9 Claims, 5 Drawing Sheets

OPTICAL SIMULCAST NETWORK WITH CENTRALIZED CALL PROCESSING

The present invention relates generally to wireless communication systems, and more particularly to a distribution network for coupling communication signals between centrally located base station equipment and remotely located subscriber units.

BACKGROUND OF THE INVENTION

Wireless communication networks, such as cellular mobile telephone and personal communications services (PCS), continue to enjoy wide spread growth and popularity. There is oftentimes a need in such systems to provide increasingly greater call handling capacity, as well as to accommodate higher peak usage. Emerging PCS networks, presently still in the stages of being implemented, demand additional design considerations such as low build out cost as they must compete with entrenched cellular networks.

Several approaches have been adopted for deploying such networks at the lowest possible cost. One approach is to increase the coverage area afforded by a given system by increasing the antenna tower height and transmit power levels beyond conventionally accepted norms. Such solutions, however, often increase the number of "blind" spots in areas that include a number of tall buildings, hills, or other natural obstructions to radio propagation.

Alternatively, the operator of the system may deploy a relatively large number of base stations with small footprints. While this avoids blind spots, it greatly increases the total capital cost for base station transceiving equipment which may cost upwards of $200,000 or more per cell site.

Other techniques deploy cells with a relatively small footprint and in a pattern which accommodates the capacity to which the system is eventually expected to grow. Then, rather than deploy base station equipment in each cell (which would be relatively cost prohibitive), backhaul distribution cables, repeaters, translators, or other techniques are used to connect the antennas to centrally located base station equipment.

For example, a suggestion has been made in U.S. Pat. No. 5,381,459 to use cable television networks to distribute wireless communication signals between base station equipment and remote transceiver sites located at each cell. This approach couples the transceiver signals over an existing coaxial cable television network using time or frequency division multiplexing in order to avoid interference with other signals being carried, such as cable television signals.

In addition, coaxial cable television networks suffer from an additional disadvantage of experiencing substantial variations in their electrical properties within even a single network, resulting in varying gain and amplification. Thus, controlling transmission power levels can be difficult. Unfortunately, precise control over transmit power levels is critical to providing reliable data transmission and predictable cell coverage, especially with digital modulation schemes.

The approach described in Patent Cooperation Treaty Application No. WO 97/32442 locates a very high capacity base station near a home cell site. Radio translator equipment units are then located in the outlying cells serviced by the home base station where low traffic density is expected. The translators connect to directional antennas that point back to the home base station site. The translator-to-base-station communication links are then assigned frequencies within the range of frequencies available to the service provider which do not conflict with the frequencies used to carry traffic within the cells themselves.

Even this approach has its shortcomings, however. In particular, initial build out requires the purchase of high capacity, expensive base station equipment which is typically much more expensive than single channel base station equipment. Furthermore, the deployment of such equipment requires complicated frequency reuse engineering as the system capacity increases, so that the frequencies in use within the cells do not conflict with the frequencies in use for backhaul between the cells and the centralized base station equipment.

Therefore, it is typically not possible to justify the cost of deploying complex base station transceiving equipment based only upon the number of initial subscribers. Because only a few cells at high expected traffic demand locations will ultimately justify the expense to build out to higher capacity equipment, the service provider is faced with a dilemma. He can initially build out the system with large footprint cells operating at high power levels and then deploy additional base station equipment by splitting cells and installing new base station equipment and towers as the capacity of the system must be increased. However, this approach not only requires re-engineering of the system every time the capacity increases, but also involves additional logistical difficulties such as obtaining permission to build additional radio towers from local authorities and the like. The other alternative is to use coaxial cable distribution networks, which suffer from unpredictable radiated power levels.

SUMMARY OF THE INVENTION

Accordingly, it is an object of the present invention to provide a simple and low cost system for coupling wireless communication signals between centrally located base station equipment and remote cell sites.

It is a further object of this invention to provide such a system with adequate control over signal power levels to enable optimum control of the resulting transmission signal power levels of the remote antennas.

It is a still further object of the present invention to eliminate some of the complexities involved with deploying such systems in the past, such as by reducing the need to mix the various types of physical communication media used to implement such a network.

Yet a further object of the present invention is to provide such a system which may distribute digitally encoded signals, such as Code Division Multiple Access (CDMA) signals, efficiently.

Briefly, the present invention makes use of a broadband distribution network consisting of optical fiber transmission media to distribute signals between centrally located base transceiver station (BTS) equipment and remotely located transceiver equipment referred to herein as "cable microcell integrators" (CMI). With this scenario, a single optical carrier at a given optical wavelength preferably carries the channelized radio frequency signals for a number of different cells or sectors thereof. The CMIs are deployed in a configuration such as one per cell and/or even sectors thereof, to provide radio frequency coverage in a pattern which approximates the eventual expected required deployment of base stations when the system is at full capacity. The same active traffic channels may then be broadcast to multiple CMIs and hence to multiple coverage areas.

Common system elements include a fiber node, which in the forward direction collects the signals radiated by one or more base stations and converts them to suitable format for transmission over the optical fiber such as at a 1550 nanometer (nm) wavelength optical carrier. At the remote sites, an optical fiber "drop" or splitter in turn feeds a fiber optic input to each cable microcell integrator (CMI).

The CMIs then convert the information at the optical wavelength to an appropriate radio frequency signal with appropriate forward radiation frequencies. For example, in the PCS bands in the United States, the forward radiated signals may occupy a 1.25 MHz bandwidth at a carrier frequency in the range of 1930–1990 MHz.

Operation in the reverse direction is analogous. The CMIs in each cell or sector receive radio frequency communication signals such as in the PCS band from 1850–1910 MHz and convert such signals to an appropriate optical signal at an appropriate reverse link carrier wavelength such as 1310 nm. The single fiber distribution network then carries the reverse link signal to the fiber node. The fiber node in turn reconverts the optical signals to the appropriate radio frequency signals at the expected PCS reverse link frequencies such as in the band from 1850–1930 MHz.

In a preferred embodiment, the reverse link CMIs generate diversity signals at different RF carriers so that a primary and a diversity channel may be fed back to the BTS.

Multiple CMIs may be configured to transmit and receive at the same RF channel frequencies. A group of CMIs arranged in this manner are referred to as a "simulcast cluster." In comparison to traditional networks wherein the full capacity of an RF channel is not fully utilized, an RF channel may not only be extended, but carefully controlled via the simulcast and is a significant improvement to network efficiency. For example, a group of Up to eight cells may be assigned in a simulcast group thereby increasing service by a single channel transceiver back at the base transceiver system equipment.

Simulcast groups may also be defined by assigning other signal characteristics in common. For example, in CDMA systems, simulcast groups are defined by assigning a common carrier frequency, common pseudonoise (PN) code, and common PN code phase offset.

As a result, a single fiber can be used as the sole distribution physical media to an entire wireless communication network, with the single optical fiber providing an RF carrier to a simulcast group directly off that single fiber.

By providing such simulcast features directly off the single optical fiber distribution network, the need to deploy both optical media, such as fiber optic cable, and radio frequency physical media, such as coaxial cables, is avoided.

Furthermore, radio frequency coverage can be engineered once, at initial deployment, with the CMIs deployed in each sector of each of what will eventually become fully operational cells. As the system is initially brought online, basic coverage is provided by assigning a large number of CMIs as a simulcast group to use the same radio frequency carrier signals. As the need for capacity increases, individual CMIs may be reconfigured to operate on different carrier frequencies, either by manual reinstallation of filtering equipment or by command signals provided over separate control channels who operate at different radio carrier frequencies.

The system thus also avoids the need to redesign the RF coverage characteristics of the system as capacity increases.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
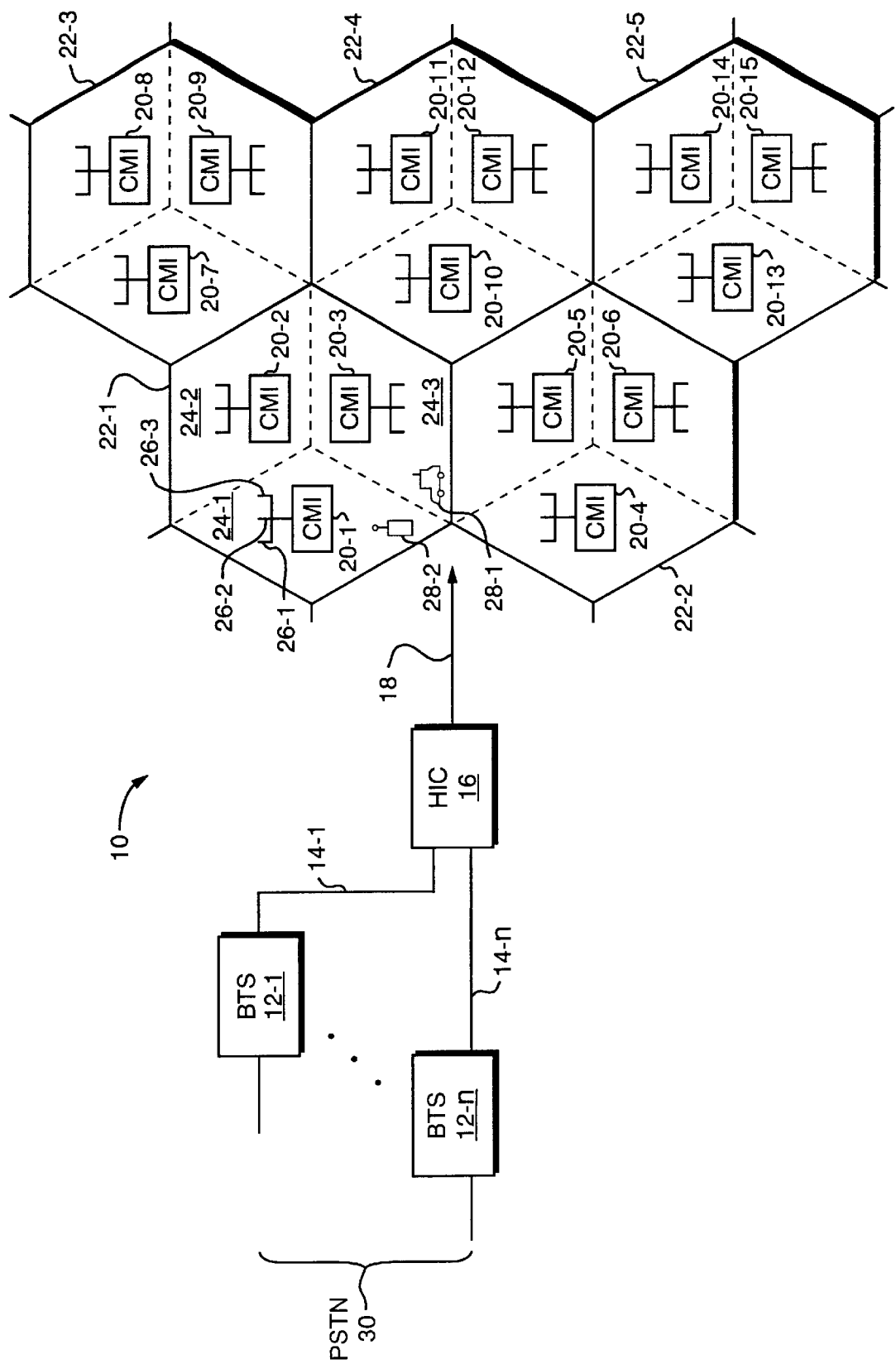
FIG. 1 is a block diagram of a wireless system making use of a broadband distribution network implemented with a single optical fiber according to the invention.

Turning attention now to the drawings more particularly, FIG. 1 is a block diagram of the components of a wireless communication system such as a Personal Communication System (PCS), or other cellular mobile telephone system, in which a fiber optic distribution media 18 is used to distribute channelized radio frequency signals upbanded onto one or more optical carriers as one or more simulcast groups.

The system 10 includes one or more conventional base transceiver stations (BTSs) 12-1, . . . , 12-n, a Hub Interface Converter (HIC) 16, and a number of Cable Microcell Integrators (CMIs) 20-1, 20-2, . . . , 20-c. In the illustrated embodiment, an exemplary cell 22-1 is divided into three 120 degree sectors 24-1, 24-2, 24-3, and there is a corresponding CMI 20-1, 20-2, 20-3 deployed for each sector. In this instance, each CMI 20-1 has associated with it typically three sectorized antennas 26-1, 26-2, 26-3. In this arrangement, three antennas 26-1, 26-2, 26-3 are typically employed in each of the sectors 24. The first antenna 26-1 is used as a transmitter antenna. The second antenna 26-2 is used as a primary reception antenna, and a third antenna 26-3 is used as a secondary reception or diversity reception antenna.

Alternatively, in a microcellular type configuration, the cell 22-1 is divided into three microcells 24-1, 24-2, 24-3, in which case the antennas 26-1, 26-2, 26-3 are omnidirectional antennas located approximately in the center of each microcell 24. It should therefore be understood that when a "sector" is referred to in the following discussion, the same can be said for a microcell in the alternate embodiment.

The BTSs 12-1 . . . 12-b are each coupled to the HIC 16 using appropriate radio frequency (RF) transmission media, such as coaxial cables 14-1, 14-n. The HIC 16 is physically located at the same centralized location as the BTSs 12. However, the HIC 16 is coupled to each of the remotely located CMIs 20-1, 20-2, . . . , 20-c using an optical fiber 18. The manner of interconnecting the CMIs and their particular manner of allocating frequency channels between the BTS 12-1 and CMIs 20 is the particular subject of the present invention.

The system 10 provides voice and/or data traffic signals between subscriber units, such as a mobile subscriber unit 28-1 located in a vehicle, and hand-held subscriber units such as 28-2. Specifically, the system 10 provides traffic signals between subscriber units 28 and a network, such as the public switched telephone network (PSTN) 30. In the particular preferred embodiment of the invention being described herein, the signaling protocol (also known as the "air interface") between the base transceiver stations (BTS) 12 and the subscriber units 28 may, for example, be the Code Division Multiple Access (CDMA) IS 95-B standard promulgated by the Telecommunications Industry Association (TIA) in the United States.

The CMIs 20 in the illustrated embodiment are each associated with a sector or microcell 24. For example, an exemplary CMI 20-1 is associated with a 120 degree sector 24-1 of a cell 22-1. CMI 20-1 is thus responsible for receiving radio signals from the subscriber unit 28-2 located within the sector 24-1 and forwarding them to one of the associated BTSs 12. Likewise, radio signals originating at one of the BTSs 12 and intended for subscriber unit 28-2 are forwarded through coaxial cable 14, HIC 16, over the optic fiber 18, to respective CMI 20-1.

As will be understood shortly, in a preferred embodiment, multiple CMIs 20 are arranged as a simulcast group such that the physical channels used to communicate with the subscriber units 28 in more than one sector, are shared. For example, in one such embodiment, the CMIs 20-1, 20-2, 20-3 associated with cell 22-1 are sharing the same radio carrier frequencies with the CMIs 20-4, 20-5, and 20-6 associated with another cell 22-2. A single BTS, such as BTS 12-1, may therefore be used to service a number of subscriber units 28 located in both cells 22-1 and 22-2.

Figure 2:
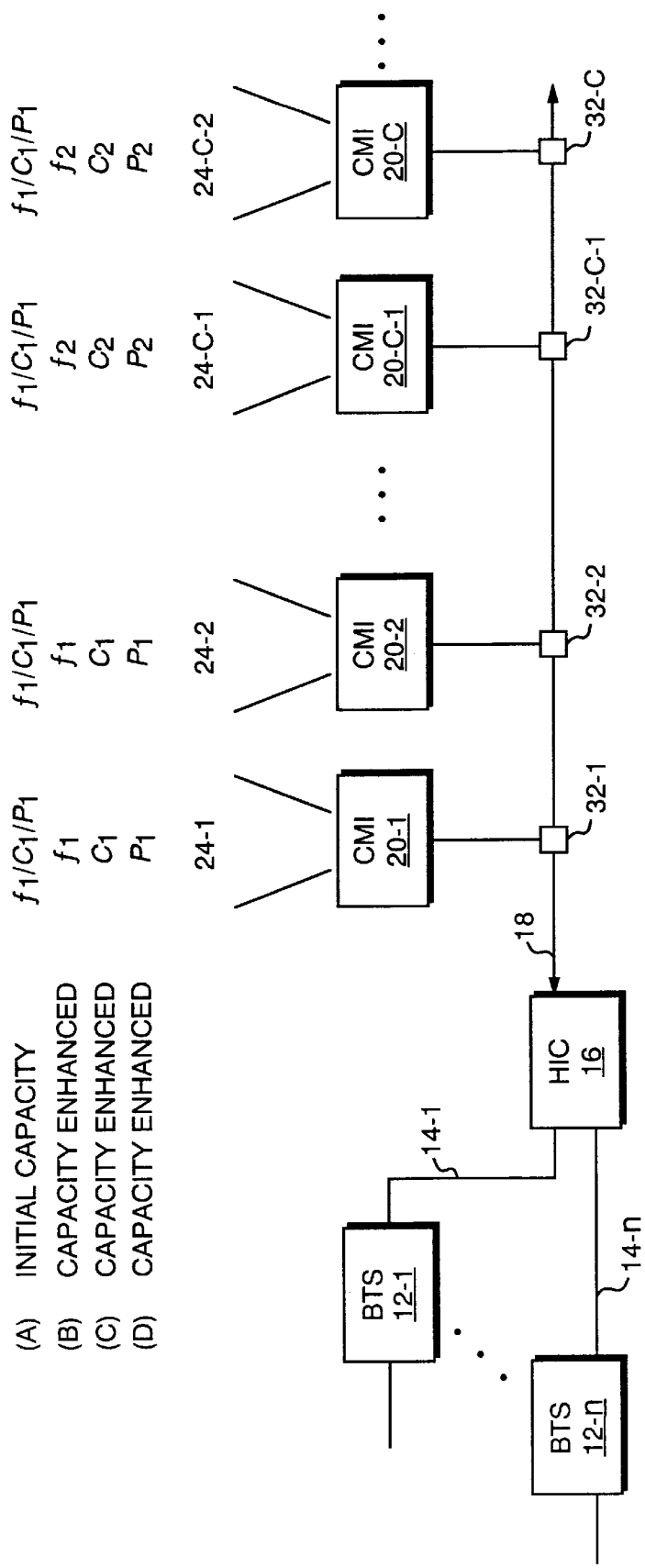
FIG. 2 is a circuit diagram of the distribution network showing how multiple CMIs are arranged to connect to the single optical fiber.

Turning attention now to FIG. 2, the arrangement of the optical media 18 and its interconnection between the HIC 16 and various CMIs 20 will be discussed. In particular, each of the CMIs 20-1 is fed from an optical fiber 18 via a corresponding optical splitter 32-1, 32-2, . . . 32-c-1, 32-c. In this manner, the single fiber 18 is used to distribute a number of RF signals which may be modulated onto a single optical carrier wavelength to a plurality of the CMIs 20-1, 20-2, . . . , 20-c.

In a forward link direction, a mode is supported wherein the same radio frequency signal is to be radiated within multiple sectors 24-1, 24-2, . . . , 24-s of a particular simulcast group. This mode eliminates the need for coaxial cables, repeaters, and other radio frequency equipment that might otherwise be necessary to be deployed between various CMIs 20-1, 20-2, . . . , 20-s in the sectors 24-1, 24-2, . . . , 24-s. For the reverse link, the various optical couplers 32-1, 32-2, . . . , 32-c efficiently sum the optically modulated carriers emanating from each corresponding CMI 20-1, 20-2, . . . , 20-c. With this arrangement, a single centrally located BTS 12-1 may service a number of CMIs 20, therefore reducing initial build out cost.

Furthermore, as can now be better understood, a bank of centrally located BTSs 12-1, 12-2, . . . , 12-n may use the common optic fiber 18 to distribute signals to a number of CMIs 20. Even at full capacity, there is a benefit to centrally locating the BTSs 12 in order to facilitate access for maintenance and logistics. In addition, in areas of hilly terrain and/or large numbers of tall buildings, link propagation distance may be naturally limited. Therefore, multiple CMIs 20 may be deployed in a configuration which optimizes radio frequency coverage while at the same time minimizing the need to deploy multiple BTSs 12.

As shown in the table at the top of FIG. 2, for a low capacity or initial system build out stage (A), the radio frequency carrier fl may be identical for each CMI 20-1, 20-2, . . . , 20-c. In a later capacity enhanced configuration (B), the sectors 24-1 and 24-2 may still constitute a simulcast group in which they are radiating with the carrier frequency fl. However, other sectors such as 24-c-1 and 24-c-2 may be assigned a different RF carrier frequency f2 to form a second simulcast group. the two RF simulcast groups may still be carried on a single optical carrier. Thus, by reassigning RF carrier frequencies, the traffic handling capacity of the system 10 is increased without the need to re-engineer the system for RF propagation, or to deploy additional antennas or radio transceiving equipment.

It should be understood that in a Code Division Multiple Access system 10, a second capacity increased configuration (C) may make use of the same carrier frequency f1 with a different pseudorandom code c1 or c2 for the different simulcast groups. In a third capacity enhanced scenario (D), the same frequency f1 and code c1 but a different code phases p1 and p2 may be assigned for the two simulcast groups.

Figure 3:
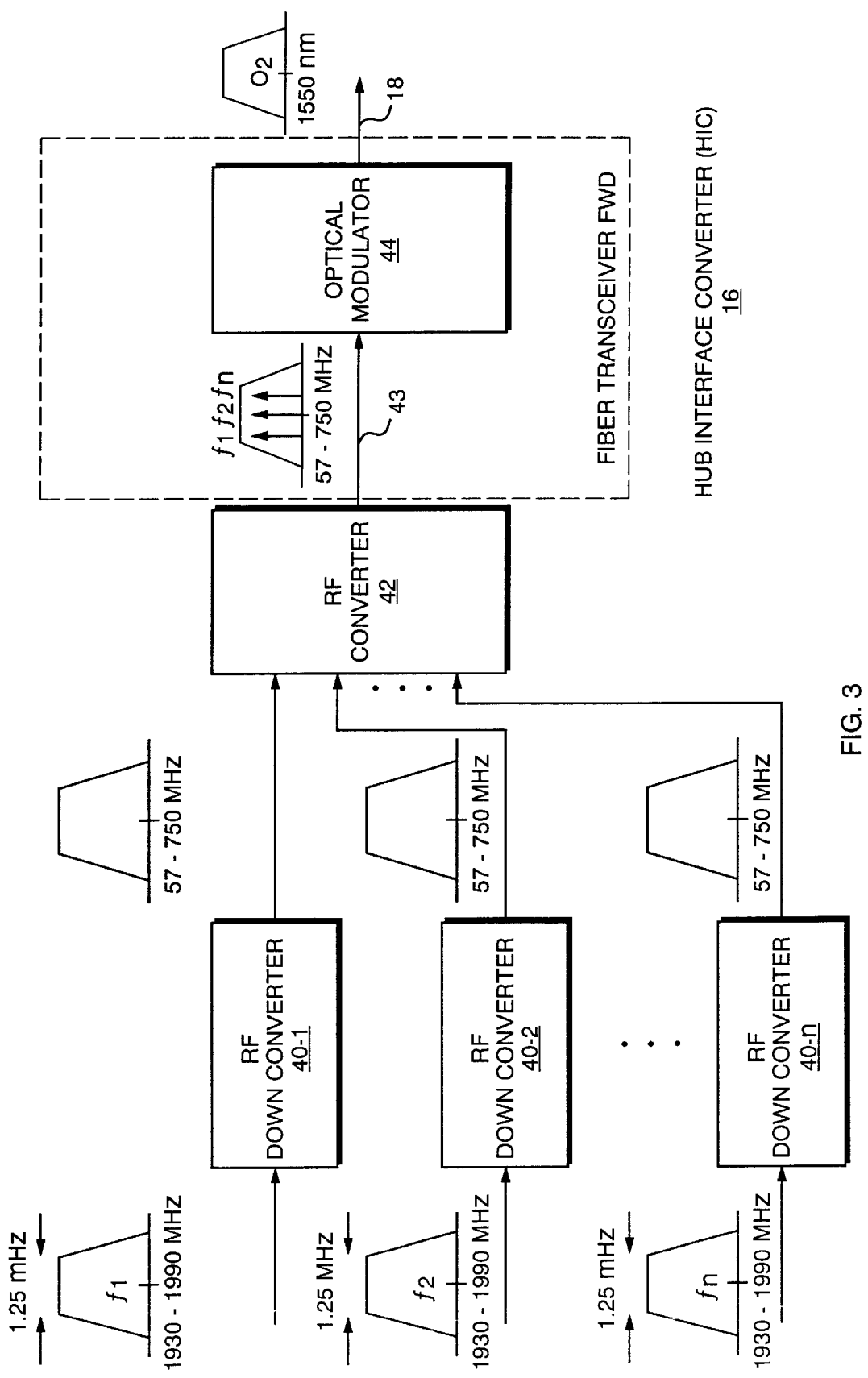
FIG. 3 is a more detailed block diagram of the forward link portion of a fiber node deployed at the central base station location or "head end" of the system.

The HIC 16 is shown in more detail in FIG. 3. In this particular view, the portion associated with implementing the forward direction, namely the direction of transmission of signals from the BTSs 12 out to the CMIs 20, is illustrated. That portion is seen to include a number of RF down converters 40-1, 40-2, . . . , 40-n that couple to an RF combiner 42 which in turn feeds an optical modulator 44. The optical modulator 44 provides the forward link direction component of a fiber optic transceiver 45.

An exemplary RF down converter 40-1 receives the RF signals generated by an associated BTS 12-1 and translates their carrier frequency to a carrier frequency in a range more typical of cable distribution networks. In the illustrated embodiment, the RF down converter 40-1 accepts a 1.25 MHz bandwidth signal, which according to the CDMA wireless interface standard in the forward direction may exist at an RF carrier in a range from 1930–1990 MHz, and converts the RF energy to a lower intermediate frequency (IF) in the range of from, for example, 57–750 MHz. In the s illustrated embodiment, the BTS 12-1 has provided signals at a carrier frequency f1 in the range indicated and a second base station 12-2 has provided a signal of 1.25 MHz at a different carrier frequency f2 but still within the forward link range of 1930–1990 MHz typical of the PCS band.

There is typically a single RF down converter 40 associated with each BTS 12; however, it should be understood that various other scenarios are possible. For example, the function of the RF combiner 42 may be provided is prior to the down conversion process implemented by the elements 40.

The RF combiner 42 accepts the down converted RF signals produced by the down converters 40-1 . . . 40-2 . . . 40-n to produce a single combined RF signal 43. The combined RF signal still contains signal components limited to within a 6 MHz bandwidth within the range of 57–750 MHz, containing the carrier frequencies f1, f2, . . . , fn. It should be understood in accordance with the above discussion that a given RF signal of 1.25 MHz on a given carrier frequency f1 may actually contain multiple traffic channels implemented with different codes c1, c2, . . . , $c_Q$ or even code phases p1, p2, . . . , pz. The combined RF signal 43 is then provided to the optical modulator 44 and upbanded to an optical frequency such as at a carrier wavelength of 1550 nanometers (nm) appropriate for transmission over the optic fiber 18.

Figure 4:
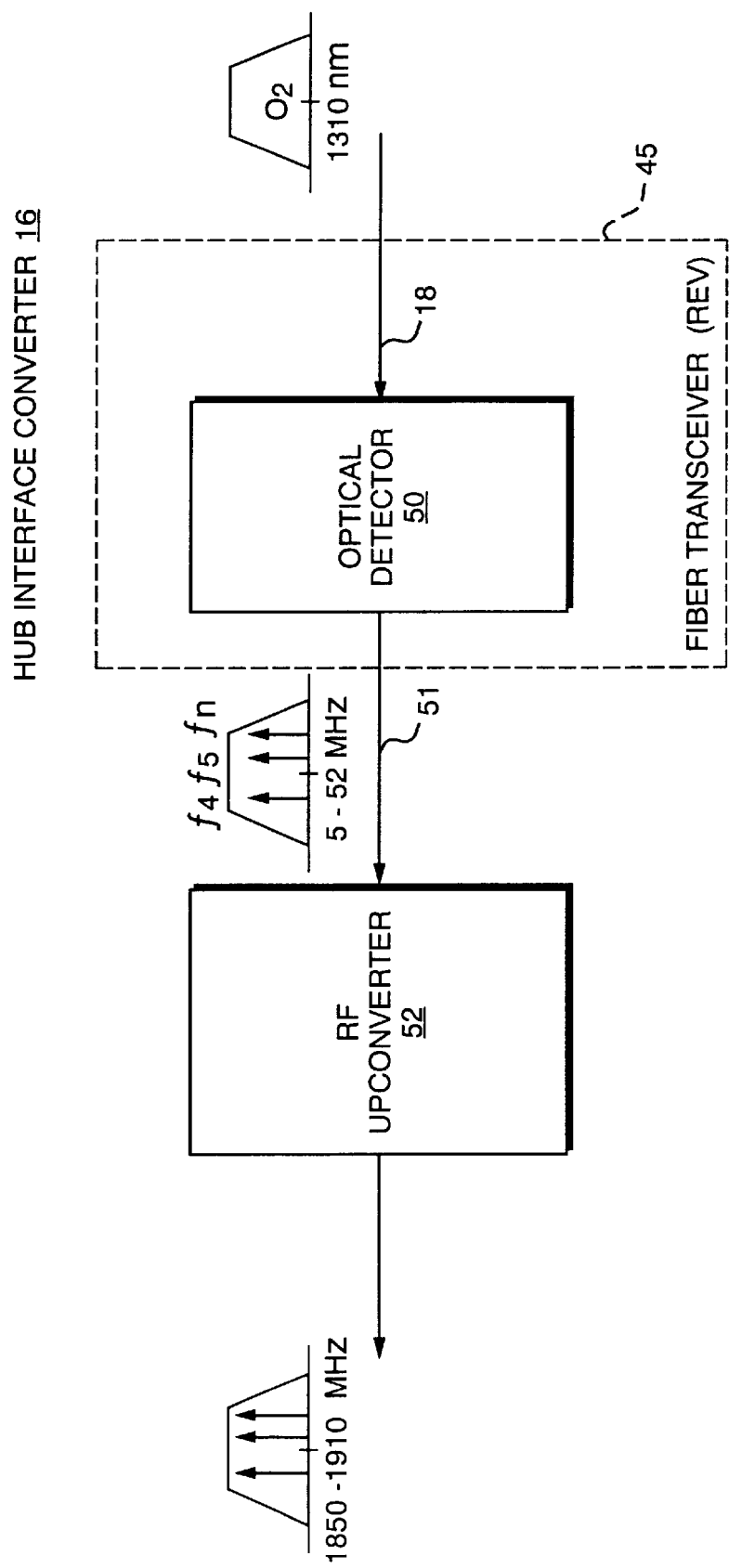
FIG. 4 is a more detailed block diagram of a reverse link direction portion of the fiber node.

FIG. 4 shows the reverse direction portions of the HIC 16 in more detail. In particular, an optical detector 50 accepts signals from the fiber 18 as received from multiple CMIs 20 in the various sectors 24. Such signals may, for example, be optically modulated onto a single optical carrier within a wavelength range of 1310 nanometers. The optical detector 50 then provides a conversion of the energy in the optical band down to a convenient intermediate frequency (IF) band such as in the range from 5–52 MHz. The optical detector 50 serves as the receiver or reverse link portion of the optical transceiver 45. The combined RF signal 51 produced by the optical detector 50 may therefore contain information at a number of carrier frequencies f4, f5, . . . , fm.

The RF upconverter 52 in turn translates such signals to a band within the PCS band used for reverse wireless transmission such as from 1850–1910 MHz as suitable for coupling to the standardized base transceiver system 12.

Figure 5:
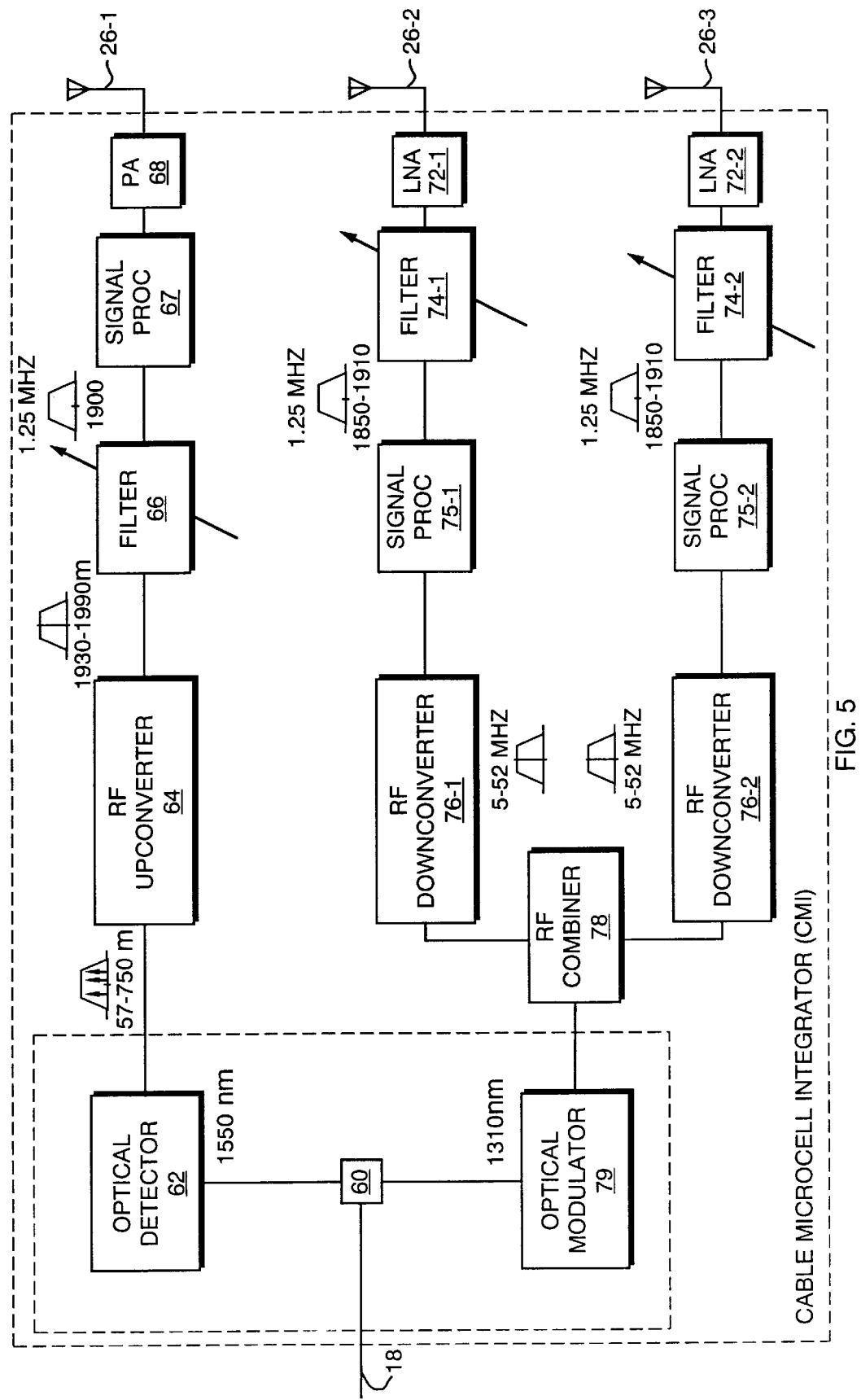
FIG. 5 is a more detailed block diagram of a Cable Microcell Integrator (CMI) deployed at an individual cell or sector location.

Turning attention to FIG. 5, the details of the CMI 20 on the forward link will now be addresses. The 1550 nm signal received from the optic fiber 18 is first fed to a splitter 60 to allow a portion of the optical energy to be fed to an optical detector 62. The optical detector 62 in the preferred embodiment accepts optical signals in a range of, for example, 1550 nanometers providing a detected signal in a 60 MHz wide forward link band at the 57–750 MHz IF carrier. This signal, which may contain the multiple RF carriers f1, f2, . . . , fn, codes or code phases as previously described, is then fed to the RF upconverter 64. The optical detector 62 and an optical modulator 79 provide an optical transceiver 80 for the CMI 20.

The output of the RF upconverter 64 is the radio frequency signal in the expected forward link range of from 1930–1990 MHz. A filter 66 restricts the transmission bandwidth to the single channel frequency bandwidth of approximately 1.25 MHz. A signal processor 67 may provide further filtering, automatic gain control, pre-amplification, or control signaling functions.

In the receive, or reverse link direction, signals received on the primary reception antenna 26-2 are first fed to a low noise amplifier 72-1 and filter 74-1. Such signals of interest are in the range of 1850–1910 MHz which are the frequency band typically associated with reverse links in the PCS region. The filter 74-1 thus produces a band limited signal of 1.25 MHz that may have multiple carriers, codes and/or phases as previously described. The signal processor 75-1 prepares such signals for RF down conversion to the IF band from 5–52 MHz.

Signals for the secondary or diversity antenna 26-3 are fed through associated filter 74-2, signal processor 75-2, and RF down converter 76-2 which perform functions analogous to that of their associated counterparts 72-1, 74-1, 75-1, and 76-1 in the primary chain. In this instance, the RF down converter 76-2 provides a frequency shift which is different than that of RF down converter 76-1 but still within the band of 5–52 MHz. This provides a system 10 with the ability to feed back a diversity antenna signal so that they can be properly processed by the receive side of the BTSs 12. The RF combiner 78 in turn accepts the signals from the RF down converter 76-1 and 76-2 and feeds them to an optical modulator 44 which upbands the information of interest to an optical carrier such as in the range of 1310 nanometers. The optical signal is then fed to the combiner 60 and back to the fiber 18.

It can now be understood how various components such as the HIC 16, single optical fiber cable 18, and cable microcell integrators 20 can be used to manage the transport of signals between the BTSs 12 and devices which radiate within respective sectors 24 or cells 22. Multiple CMIs 20 can thus be assigned to transmit and receive on the same radio frequency channels as a simulcast cluster. In comparison to a traditional distribution network where the full capacity of an RF channel is not fully utilized, the coverage area of a single RF channel may be extended through the simulcast of RF carriers over a common optical fiber. This provides a significant improvement in network efficiency and capacity control. Furthermore, by incorporating optical modulation and detection equipment entirely within the remote CMIs 20 themselves, the difficulties associated with previous hybrid distribution networks requiring the interconnection of both coaxial cables and optical fiber are avoided.

It should also be understood that the particular filters 66, 74-1, and 74-2 deployed in each CMI 20 are chosen to achieve the desired operational effect of the invention. In particular, the filters 66 and 74 need to be set to the appropriate RF carrier frequency so that the CMI simulcast clusters are appropriately implemented. For example, the filters 66 associated with given CMI cluster, such as the cluster 24-1, 24-2, 24-3, will each be tuned to the same RF carrier frequency. Likewise, the filters 74-1, 74-2 associated with such CMIs 20-1, 20-2, 20-3 intended to be part of a cluster are also tuned to the same carrier frequency.

Therefore, reconfiguration of the distribution network such as when a higher capacity system is desired, requires only reconfiguration of the filters 66 and 74. This may be carried out manually, by either implementing such filters as a tunable circuit that may be adjusted by a technician in the field with potentiometers or the like or in a more sophisticated system, it may be programmable such that they may be controlled by control signals provided over the optic fiber 18 and various dedicated control channels within the associated available bandwidth of operation.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A wireless communication system in which a plurality of cells are located substantially adjacent one another, the wireless communication system operating over a specified frequency range to provide signals in a forward direction from a central base transceiver station towards subscriber units located in the cells, the system comprising:

a hub interface converter, for accepting radio frequency signals from at least one base station, the radio frequency signals comprising at least one base station traffic signal modulated onto a radio frequency carrier (RF), for upconverting such radio frequency signals to an optical frequency carrier signal, and for coupling such optical frequency carrier signal as an optical forward transport signal onto an optical fiber;

an optical fiber for distributing the optical forward transport signal;

a plurality of optical splitters connected to the optic fiber; and a plurality of cable integrators, each receiving the optical transport signal from one of the splitters, each cable integrator associated with a respective one of the cells, each cable integrator further including an optical demodulator to translate the optical forward transport signal to corresponding transmit radio frequency signals such that the transmit radio frequency signals in at least two cells have the same radio frequency carrier.

2. A system as in claim 1 wherein the hub interface converter additionally comprises:

a plurality of RF down converters, each RF down converter for translating radio frequency energy in a forward link radio frequency bandwidth including the radio frequency carrier to an output intermediate frequency signal at an intermediate frequency carrier;

an RF combiner for combining the output intermediate frequency signals from multiple RF down converters to produce a combined RF signal; and an optical modulator for upconverting the combined RF signal to produce the optical transport signal.

3. A system as in claim 1 wherein the cable microcell integrator further comprises:

an optical detector for receiving the optical forward transport signal from the optical cable as a detected signal; and an RF upconverter for converting the detected signal to a radio frequency carrier within a forward link radio frequency bandwidth.

4. A system as in claim 1 wherein the cells are divided into sectors, and where cable integrators are deployed in two or more adjacent cell sectors.

5. A system as in claim 1 wherein the cells are divided into microcells, and wherein cable integrators are deployed in two or more adjacent microcells.

6. A system as in claim 1 wherein Code Division Multiple Access (CDMA) is used to modulate the traffic signals onto the radio frequency carrier signals, and wherein the transmit radio frequency signals in at least two cells have the same code.

7. A system as in claim 1 wherein Code Division Multiple Access (CDMA) is used to modulate the traffic signals onto the radio frequency carrier signals, and wherein the transmit radio frequency signals in at least two cells have the same code phase.

8. A system as in claim 1 wherein the cable cell integrators additionally include optical modulators for accepting subscriber radio frequency signals from the subscriber units, and upconverting the subscriber radio frequency signals to an optical frequency carrier signal as an optical reverse transport signal coupled to the optical fiber.

9. A system as in claim 8 wherein the hub interface converter additionally comprises an optical demodulator to translate the optical reverse transport signal to corresponding radio frequency signals within a reverse link bandwidth which are in turn coupled to one or more of the base stations.

* * * * *